United States Patent
Deck

(10) Patent No.: US 9,499,221 B2
(45) Date of Patent: Nov. 22, 2016

(54) INTEGRATED DUCT STEP GARNISH ASSEMBLY

(71) Applicant: Honda Motor Co., Ltd., Tokyo (JP)

(72) Inventor: Dennis Delon Deck, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 753 days.

(21) Appl. No.: 13/934,350

(22) Filed: Jul. 3, 2013

(65) Prior Publication Data

US 2015/0011146 A1    Jan. 8, 2015

(51) Int. Cl.
  *B60H 1/34*   (2006.01)
  *B62D 65/00*  (2006.01)
  *B62D 25/02*  (2006.01)
  *B60R 3/00*   (2006.01)
  *B60H 1/00*   (2006.01)

(52) U.S. Cl.
  CPC .......... *B62D 65/00* (2013.01); *B60H 1/00564* (2013.01); *B60R 3/00* (2013.01); *B62D 25/025* (2013.01); *Y10T 29/49826* (2015.01)

(58) Field of Classification Search
  CPC .................. B60H 1/00564; B60R 3/00; B60R 2013/046; B62D 25/025
  USPC ................................................. 296/208, 209
  See application file for complete search history.

(56) References Cited

U.S. PATENT DOCUMENTS

| | | | |
|---|---|---|---|
| 2,997,329 A * | 8/1961 | Chapman | B60R 13/04 296/191 |
| 3,078,116 A * | 2/1963 | West | B62D 25/025 296/208 |
| 3,455,595 A * | 7/1969 | Eggert, Jr. | B60H 1/0055 296/208 |
| 5,671,967 A * | 9/1997 | Gurganus | B60R 13/0206 296/146.9 |
| 5,902,007 A * | 5/1999 | Koester | B60R 13/0206 296/199 |
| 6,062,633 A * | 5/2000 | Serizawa | B60R 16/0215 296/199 |
| 6,193,306 B1 * | 2/2001 | Lee | B62D 25/02 296/181.4 |
| 6,974,238 B2 * | 12/2005 | Sturt | B60Q 3/004 257/89 |
| 6,979,054 B2 * | 12/2005 | Yamamoto | B60R 13/04 296/209 |
| 7,364,224 B2 * | 4/2008 | Wozniak | B60R 16/0207 296/193.07 |
| 8,007,037 B2 | 8/2011 | Wolkersdorfer | |
| 8,128,161 B2 * | 3/2012 | Yang | B60H 1/00564 296/208 |

(Continued)

FOREIGN PATENT DOCUMENTS

| | | |
|---|---|---|
| JP | 2008068811 | 3/2008 |
| KR | 100552063 | 2/2006 |

*Primary Examiner* — Steven B McAllister
*Assistant Examiner* — Jonathan Cotov
(74) *Attorney, Agent, or Firm* — Rankin, Hill & Clark LLP

(57) ABSTRACT

An integrated duct step garnish assembly for a vehicle includes a deck member defining a stepping area on an upper side thereof and an underside member secured to an underside of the deck member for defining an air duct between the underside member and the deck member. The air duct extends along a longitudinal length of the deck member and the underside member for delivering conditioned airflow to a rear of the vehicle.

20 Claims, 6 Drawing Sheets

(56) References Cited

U.S. PATENT DOCUMENTS

| | | | | |
|---|---|---|---|---|
| 8,327,600 | B2* | 12/2012 | Stepan | B60R 13/04 |
| | | | | 296/1.08 |
| 8,668,253 | B2* | 3/2014 | Bauer | B60R 16/0215 |
| | | | | 296/1.08 |
| 2004/0169401 | A1* | 9/2004 | Laborie | B60H 1/00564 |
| | | | | 296/208 |
| 2004/0185223 | A1* | 9/2004 | Yamamoto | B29C 45/1704 |
| | | | | 428/99 |
| 2005/0225121 | A1* | 10/2005 | Schoemann | B60H 1/00564 |
| | | | | 296/208 |
| 2005/0282485 | A1* | 12/2005 | Kato | B60H 1/243 |
| | | | | 454/136 |
| 2007/0052262 | A1* | 3/2007 | Wolf | B60H 1/0055 |
| | | | | 296/208 |
| 2007/0123157 | A1* | 5/2007 | Shah | B60H 1/0055 |
| | | | | 454/121 |
| 2009/0033058 | A1* | 2/2009 | VanderGriend | B60R 3/00 |
| | | | | 280/164.1 |
| 2013/0257106 | A1* | 10/2013 | Sawyer | B60H 1/00564 |
| | | | | 296/208 |

* cited by examiner

INTEGRATED DUCT STEP GARNISH ASSEMBLY

BACKGROUND

Air ducting is commonly used in vehicles to direct conditioned air from a heating, ventilation, and air conditioning (HVAC) system to desired locations within the vehicle. Some vehicles include such air ducting that directs conditioned air flow from an HVAC system to a rear of the vehicle, including to an area disposed behind a second row of seats in the vehicle (e.g., to a third row of vehicle seats). Such ducting is often routed along the side sill member of the vehicle and often directly on an upper side of the side sill member. One challenge with running the air ducting along the side sill member is that egress and ingress may occur for the vehicle over the side sill member at the location along which the ducting is provided. For example, air ducting may be provided along an upper side of a side sill member at the location of a rear door opening (e.g., a rear door opening provided at the location of a second row of seats with the air ducting providing conditioned air to a third row of seats disposed behind the second row).

Such air ducting may be provided for purposes of providing conditioned air to a rear of the vehicle, such as behind the rear door opening along which the air ducting is provided. In one arrangement, the ducting is disposed below a rear step garnish to a third row seating area. Such ducting can be formed of blow molded plastic, but this typically requires separate features to be molded into the step garnish member to provide adequate structural support while simultaneously providing sufficient space for the blow molded duct therebelow. This ultimately results in inefficient use of space. In particular, the stepping space is reduced (i.e., to provide adequate space for the ducting, the step garnish or a portion thereof is elevated relative to the sill member thereby reducing stepping space), which results in the step being higher from the ground. Additionally, the step garnish is harder to install and/or it is heavier.

SUMMARY

According to one aspect, an integrated duct step garnish assembly for a vehicle includes a deck member defining a stepping area on an upper side thereof and an underside member secured to an underside of the deck member for defining an air duct between the underside member and the duct member. The air duct extends along a longitudinal length of the duct member and the underside member for delivering conditioned airflow to a rear of the vehicle.

According to another aspect, a combination step garnish and duct member for mounting to a sill member of a vehicle includes an injection molded deck member having an upper surface defining a stepping area and an injection molded underside member secured to an underside of the deck member to form a longitudinally extending air duct between the deck member and the underside member. The underside member includes a plurality of integrally molded supporting structures for maintaining structural integrity of the air duct during application of stepping force to the stepping area.

According to a further aspect, a method for installing an integrated duct step garnish assembly in a vehicle includes securing an underside member to an underside of a deck member to define an air duct between the underside member and the deck member. The deck member has a stepping area defined on an upper side thereof. The method further includes securing the underside member to a sill member in the vehicle and connecting inlet and outlet apertures of the air duct that are defined in the underside member to associated duct members disposed at longitudinal ends of the underside member.

DETAILED DESCRIPTION

Figure 1:
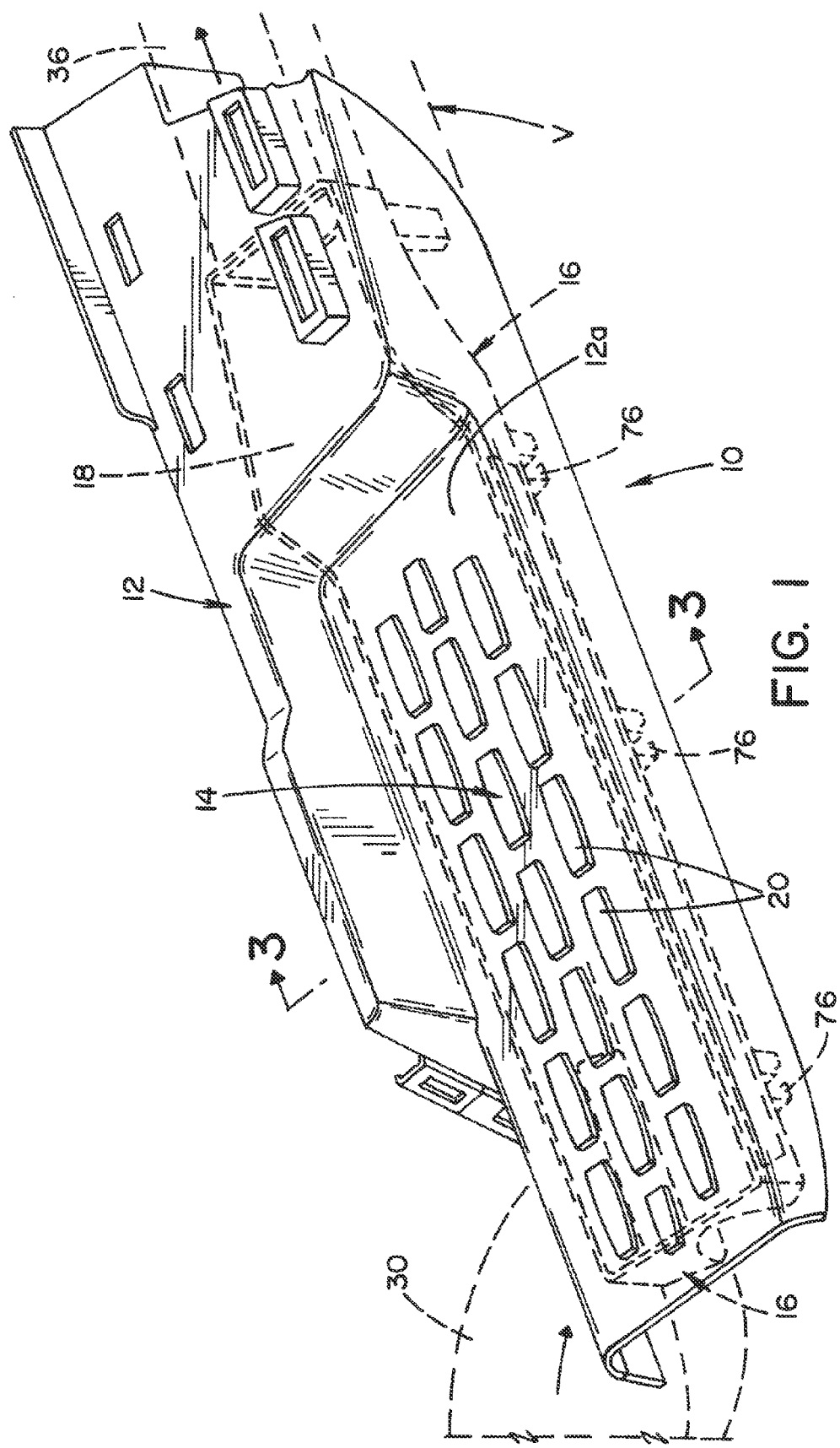
FIG. 1 is a perspective view of an integrated duct step garnish assembly installed in a vehicle according to an exemplary embodiment.
Figure 2:
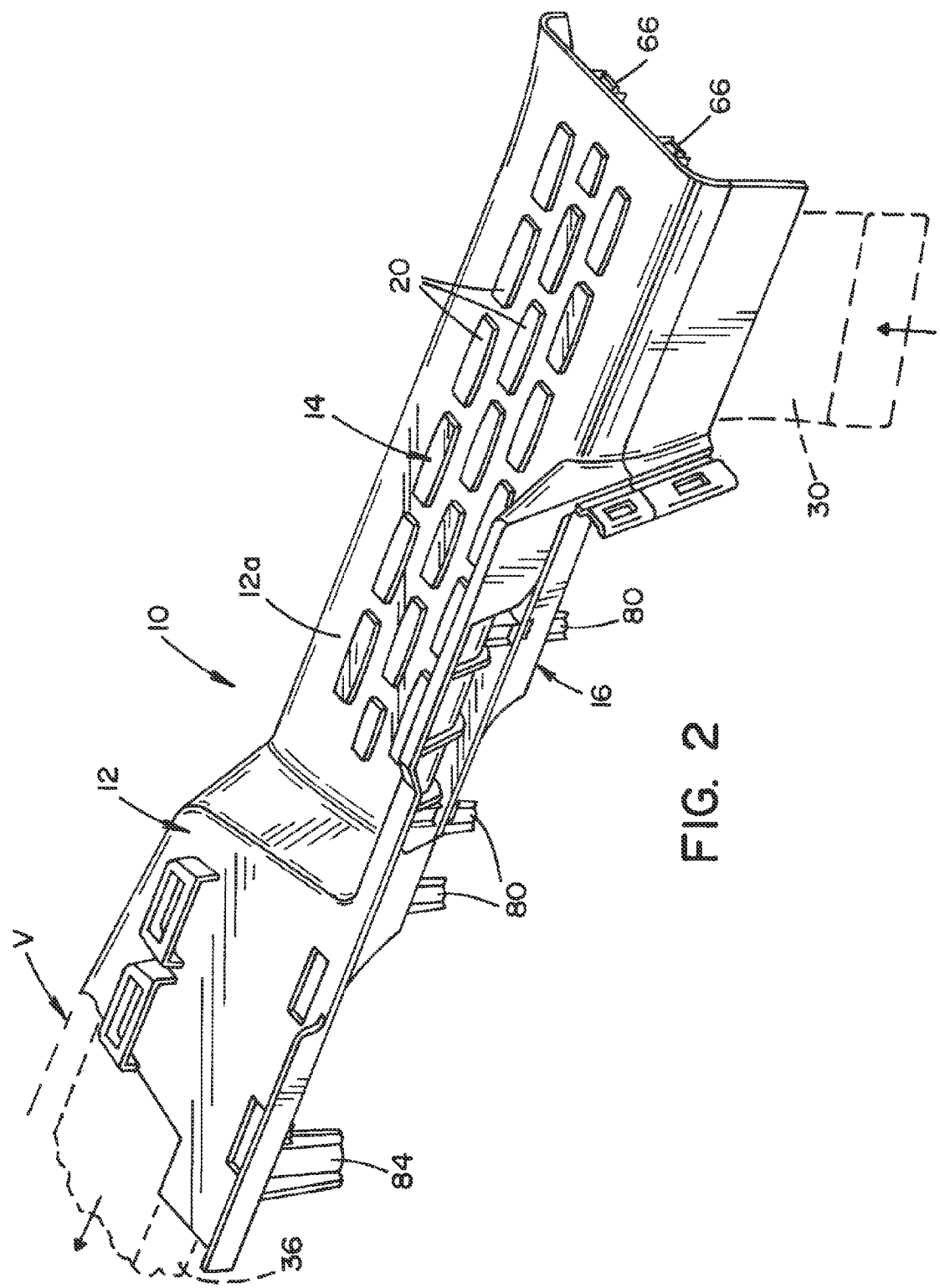
FIG. 2 is another perspective view (shown from inside the vehicle) of the integrated duct step garnish assembly of FIG. 1.

With reference now to the figures wherein the showings are for purposes of illustrating one or more embodiments only and not for purposes of limiting the same, an integrated duct step garnish assembly for a vehicle is shown and generally indicated by reference number 10. The garnish assembly 10 includes a deck member 12 defining a stepping area 14 on an upper side 12a thereof. With additional reference to FIGS. 2 and 3, the garnish assembly 10 also includes an underside member 16 secured to an underside 12b of the deck member 12 for defining an air duct 18 between the underside member 16 and the deck member 12. The air duct 18 extends along a longitudinal length of the deck member 12 and the underside member 16 for delivering conditioned airflow to a rear of the vehicle V (the rear of the vehicle V illustrated to the right in FIG. 1 and illustrated to the left in FIG. 2). In particular, the air duct 18 can deliver conditioned airflow to the rear of the vehicle V as illustrated by the arrows in FIGS. 1 and 2.

As shown, the stepping area 14 can have a plurality of raised elements 20 that reduce slippage when stepping on the stepping area 14 during ingress or egress of the vehicle V at the location of the stepping area 14. In the illustrated embodiment, the raised elements 20 are longitudinally spaced and laterally aligned in rows, though it should be appreciated that other configurations could be used. The stepping area 14 is an area where a person may step onto when entering or exiting the vehicle V during entry or exit of the vehicle V. Each of the deck member 12 and the underside member 16 can be injection molded to impart structural integrity to the air duct 18. Such improved structural integrity allows for more efficient use of space allowing the vehicle V to be smaller, step height to the stepping area 14 to be lower or reduced, insulation requirements to be met, all while providing proper support for the stepping area 14.

Figure 3:
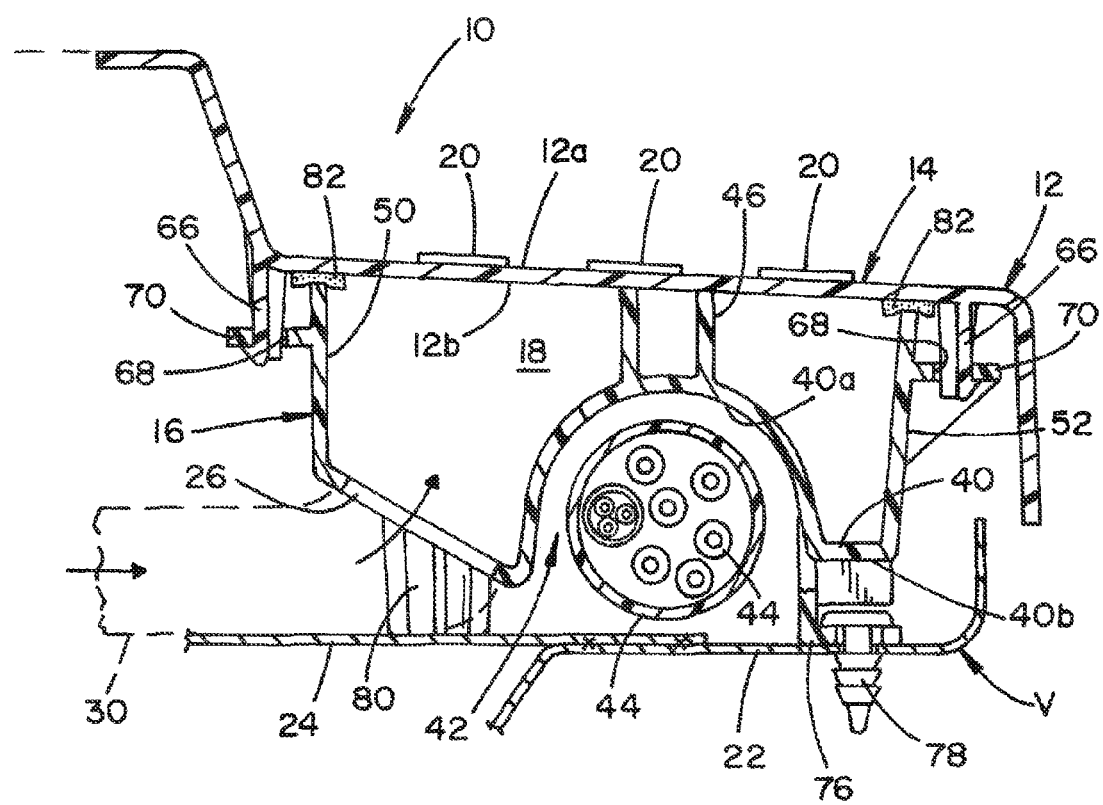
FIG. 3 is a cross-sectional view of the integrated duct step garnish assembly taken along the line 3-3 of FIG. 1.

As best shown in FIG. 3, the garnish assembly 10 is disposed on a side sill member 22 of the vehicle V. As is known by those skilled in the art, the sill member 22 can form a portion of the vehicle body and can have a floor member 24 secured thereto, such as by welding. In the illustrated embodiment, the garnish assembly 10 is disposed on top of the sill member 22 and also on the floor member 24 at about the location where the floor member 24 is secured to the sill member 22, though this exact positioning is not required. Though not shown, the garnish assembly 10 can be particularly located in the vehicle V at the location of a rear door opening (e.g., aligned with a second row of vehicle seats) so that the stepping area 14 functions as an additional stepping surface for a vehicle occupant when entering the vehicle V or exiting the vehicle V through the rear door opening. The garnish assembly 10 functions to provide the stepping area 14 at this location while simultaneously providing the air duct 18 for delivering conditioned air along the rear door opening to a portion of the vehicle V disposed rearward of the rear door opening (e.g., to a third row of vehicle seats).

Figure 4:
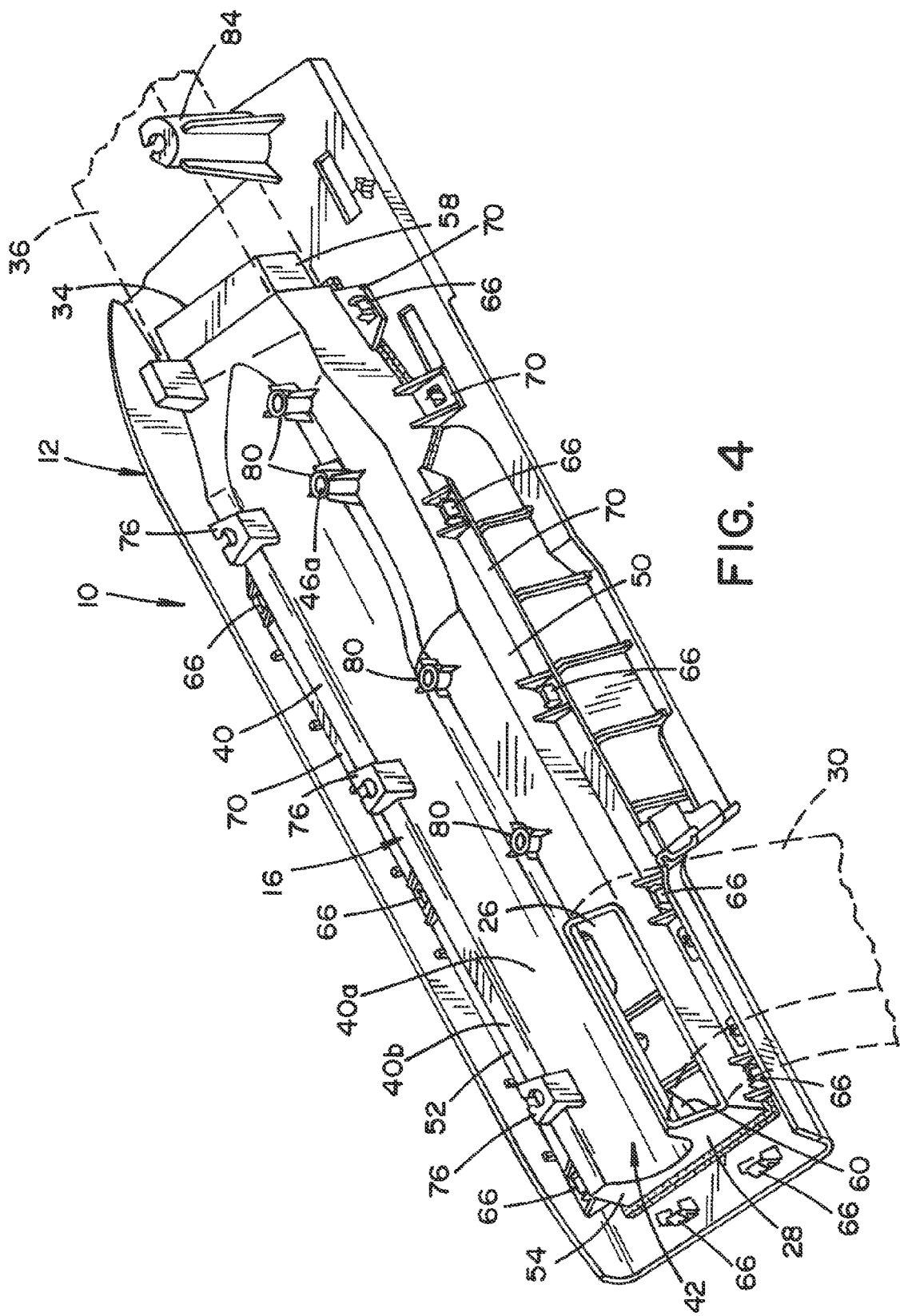
FIG. 4 is an underside perspective view of the integrated duct step garnish assembly of FIG. 1.
Figure 5:
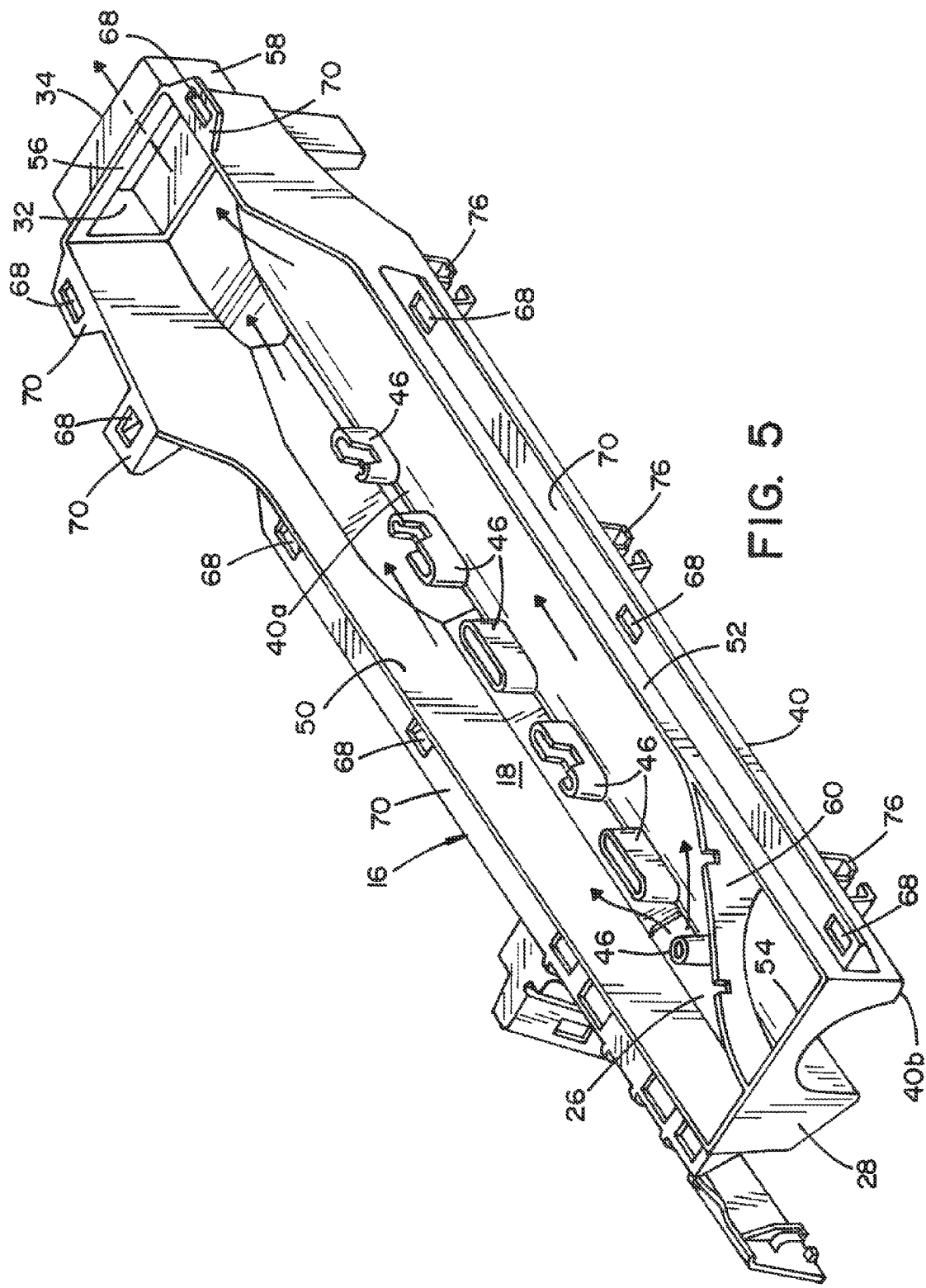
FIG. 5 is a top side perspective view of an underside member of the integrated duct step garnish of FIG. 1, the underside member shown in isolation.

With additional reference to FIGS. 4 and 5, the underside member 16 defines an inlet aperture 26 therein for the air duct 18. In the illustrated embodiment, the inlet aperture 26 is fully defined by the underside member 16 adjacent a forward end 28 of the underside member 16. That is, the inlet aperture 26 has its entire periphery or perimeter defined solely by the underside member 16. As shown in phantom lines in FIGS. 3 and 4, the inlet aperture 26 can be connected to an associated duct member 30 that delivers conditioned air from an HVAC system (not shown) to the garnish assembly 10, and particularly to the air duct 18 defined by the garnish assembly 10. In addition, the underside member 16 defines an outlet aperture 32 therein for the air duct 18. Like the inlet aperture 26, the outlet aperture 32 can be fully defined by the underside member 16, but at a rearward end 34 of the underside member 16, as shown in FIG. 5. Another associated duct member 36 can be connected to the garnish assembly 10, and particularly fluidly connected to the outlet aperture 32, so that conditioned air passing through the air duct 18 is received by the associated duct member 36 for delivery within the vehicle V rearward of the garnish assembly 10, such as through a rearwardly disposed vent opening (not shown) in the vehicle V.

The garnish assembly 10 can further include vertically extending structural support members interposed between the deck member 12 and the underside member 16 to maintain the structural integrity of the air duct 18. In particular, the vertically extending structural support members can be integrally formed with the underside member 16 and can extend upward from a lower wall 40 of the underside member 16. In the illustrated embodiment, the lower wall 40 includes a curved section 40a defining a conduit recess 42 into an underside 40b of the lower wall 40 that extends along a longitudinal length of the underside member 16 for accommodating one or more conduits 44 extending below the underside member 16. In addition, the curved configuration provided by the curved section 40a also advantageously imparts additional reinforcing strength to the underside member 16 in the same manner that an embossment provides increased strength to a plate member. As shown in the illustrated embodiment, the conduit recess 42 can be particularly sized to accommodate a conduit in the configuration of a wire harness, which itself carries a plurality of further conduits or wires 44. The vertically extending structural support members, in the illustrated embodiment, include a plurality of longitudinally spaced pillar structures 46. The pillar structures 46 are disposed on the curved section 40a of the lower wall 40 and extend upward therefrom toward, and optionally in contact with, the underside 12b of the deck member for supporting the deck member 12.

In addition to the lower wall 40, the underside member 16 also includes a plurality of side walls 50, 52, 54, 56 extending upwardly from the lower wall 40 to define lateral sides and longitudinal ends of the air duct 18. The side wall 54 forms a longitudinal end of the air duct 18 and defines the forward end 28 of the underside member 16. The sidewall 56 forms a longitudinal end of the air duct 18 and includes insertion portion 58 that is receivable within the associated duct member 36. The walls 50 and 52 form lateral sides of the air duct 18. In addition to the pillar structures 46, the side walls 50, 52, 54, 56 can also be considered the vertically extending structural support members that are integrally formed with the underside member 16 and extend upward from the lower wall 40 thereof to provide underside support to the deck member 12. In addition to the pillar structures 46 and side walls 50-56, the vertically extending structural support members can further include other members (e.g., other walls) extending upward from the lower wall 40 to provide underside support to the deck member 12. For example, in the illustrated embodiment in FIG. 5, a reinforcing wall 60 extends upward from the lower wall 40 and connects at its longitudinal ends to the side walls 52 and 54.

The reinforcing wall 60 also functions to more smoothly guide airflow entering through the inlet aperture 26 around the ninety-degree turn presented by the air duct 18 immediately downstream of the inlet aperture 26. In the illustrated embodiment, the reinforcing wall 60 has a serpentine shape for smoothly guiding airflow entering the air duct 18 through the inlet aperture 26. More particularly, a direction of airflow entering the inlet aperture 26 is perpendicularly oriented relative to a longitudinal extent of the air duct 18. The reinforcing wall 60, as shown, is angled obliquely relative to each of the direction of airflow entering the inlet aperture 26 and the longitudinal extent of the air duct 18 to smoothly guide the airflow around the ninety degree turn defined by the inlet aperture 26 and the longitudinal extent of the air duct 18.

The garnish assembly 10 can further include a plurality of integrally molded clips 66 that extend from one of the deck member 12 and the underside member 16 and are removably received in corresponding apertures 68 defined in the other of the deck member 12 and the underside member 16 to secure the deck member 12 and the underside member 16 to one another. In particular, in the illustrated embodiment, the garnish assembly 10, and particularly the underside member 16, includes a plurality of mounting flanges 70 extending laterally outwardly from the plurality of side walls 50, 52 defining the lateral sides of the air duct 18. The mounting flanges 70 define the apertures 68 therein that receive the integrally molded clips 66 of the deck member 12 for securing the underside member 16 and the deck member 12 together. That is, the integrally molded clips 66 are provided on the deck member 12 and the corresponding apertures 68 are provided in the underside member 16 in the illustrated embodiment. It is to be appreciated, however, that this arrangement could be reversed and the apertures 68 could be provided on the deck member 12 with the integrally molded clips 66 provided on the underside member 16.

In addition, the underside member 16 can include a plurality of integrally molded clip structures 76 disposed on an underside 40b of the lower wall 40 that cooperate with associated clips 78 (one shown in FIG. 3) for fixedly securing the underside member 16 to the side sill member 22 of the vehicle V. Other integrally molded structures 80 can also be provided on the underside 40b of the lower wall 40, and thus of the underside member 16, that facilitate securement of the underside member 16 to the side sill member 22. For example, these structures 80 can include fastener structures associated with various ones of the pillar structures for receiving a fastener, such as a screw (not shown). The structures 80 can also include general support structures that are used without a fastener. As shown in the illustrated embodiment, those pillar structures 46 associated with structures 80 on the underside 40b of the underside member 16 can be particularly configured for ease of use with the fastener to be received therethrough (e.g., can include relief recess 46a).

Figure 6:
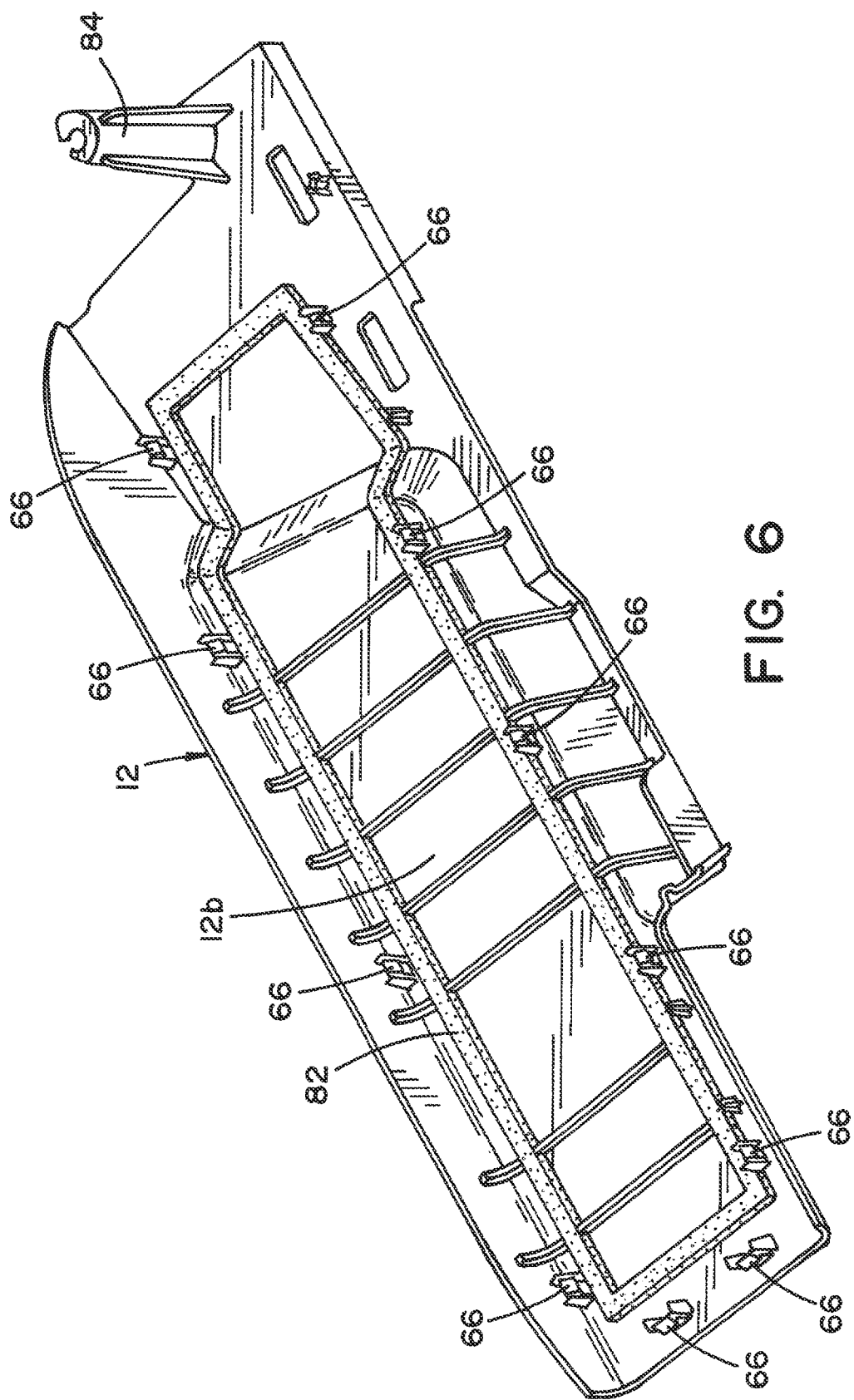
FIG. 6 is an underside perspective view of a deck member of the integrated duct step garnish assembly of FIG. 1, the deck member shown in isolation.

In the illustrated embodiment, the clips 66 are integrally formed on the deck member 12 and extend from the underside 12b thereof as best shown in FIG. 6. The deck member 12 can include a shape that substantially conforms to the shape of the underside member 16 so that the deck member 12 closes the air duct 18 when secured to the underside member 16. In particular, the air duct 18 is contained within the deck member 12 and the underside member 16 when the clips 66 of the deck member 12 are received into or clipped into the apertures 68 defined in the underside member 16. To seal the air duct 18, a seal 82 can be interposed between the deck member 12 and the underside member 16 to prevent leakage of air from the air duct 18.

In the illustrated embodiment, the seal 82 is affixed (e.g., adhered) to the underside 12b of the deck member 12. The seal 82 can be a perimeter seal having a generally rectangular configuration, as shown, that extends along a substantial longitudinal extent of the deck member 12 and also along a substantial lateral extent of the deck member 12. When the deck member 12 and the underside member 16 are secured together, the seal 82 engages distal ends or edges of the side walls 50, 52, 54, and 56 (also referred to herein as wall members) extending upward from the underside member 16, and particularly upward from the lower wall 40 of the underside member 16, to define and/or seal the air duct 18. The deck member 12 can additionally include one or more integrally molded structures 84 that further facilitate securement of the garnish assembly 10 to the sill member 22. For example, the illustrated structure 84 can engage the sill member 22 and is configured to receive a fastener (not shown) that fixedly secures the garnish assembly 10 to the sill member 22.

A method for installing an integrated duct step garnish assembly in a vehicle will not be described. In particular, the method will be described in association with the integrated duct step garnish assembly 10 described hereinabove, though this is not required and the method can be used with other garnish assemblies. In the method as applied to the illustrated garnish assembly 10, the underside member 16 is secured to the underside 12b of the deck member 12 to define the air duct 18 between the underside member 16 and the deck member 12. As discussed above, the deck member 12 has a stepping area 14 defined on the upper side 12a thereof. Also in the method, the underside member 16 is secured to the sill member 22 in the vehicle V. This can include passing clips 78 through clip structures 76 to secure the underside member 16 to the sill member 22. This can also include using other fasteners (e.g., screws, not shown) that are received through the pillar structures 46 and function together with structures 80 to secure the underside member 16 to the sill member 22. Additionally, the method can include connecting the inlet and outlet apertures 26, 32 of the air duct 18 that are defined in the underside member 16 to associated duct members 30, 36 disposed at longitudinal ends of the underside member 16.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An integrated duct step garnish assembly for a vehicle, comprising:
    a deck member defining a stepping area on an upper side thereof; and
    an underside member removably secured to an underside of the deck member to define an air duct between the underside member and the deck member, the air duct extending along a longitudinal length of the deck member and the underside member for delivering conditioned airflow to a rear of the vehicle, the underside member nonintegrally formed relative to the deck member.

2. The integrated duct step garnish assembly of claim 1 further including:
    vertically extending structural support members interposed between the deck member and the underside member to maintain the structural integrity of the air duct.

3. The integrated duct step garnish assembly of claim 2 wherein the vertically extending structural support members are integrally formed with the underside member and extend upward from a lower wall of the underside member into abutting contact with the underside of the deck member.

4. The integrated duct step garnish assembly of claim 3 wherein the vertically extending structural support members include a plurality of longitudinally spaced pillar structures.

5. The integrated duct step garnish assembly of claim 3 wherein the lower wall includes a curved section defining a conduit recess into an underside of the lower wall extending along a longitudinal length of the underside member and one or more conduits extending below the underside member are accommodated in the conduit recess.

6. The integrated duct step garnish assembly of claim 1 wherein the underside member defines an inlet aperture therein for the air duct, the inlet aperture fully defined by an underside member adjacent a forward end of the underside member.

7. The integrated duct step garnish assembly of claim 6 wherein a direction of airflow entering the inlet aperture is perpendicularly oriented relative to a longitudinal extent of the air duct, and further wherein a reinforcing wall is angled obliquely relative to each of the direction of airflow entering the inlet aperture and the longitudinal extent of the air duct to smoothly guide the airflow around a ninety degree turn defined by the inlet aperture and the longitudinal extent of the air duct.

8. The integrated duct step garnish assembly of claim 7 wherein the stepping area has a plurality of raised elements that reduce slippage when stepping on the stepping area during ingress or egress of the vehicle at the location of the stepping area.

9. The integrated duct step garnish assembly of claim 1 further including:
    a seal interposed between the deck member and the underside member to prevent leakage of air from the air duct.

10. The integrated duct step garnish assembly of claim 9 wherein the seal is a perimeter seal having a generally rectangular configuration that extends along a substantial longitudinal extent of the deck member and a substantial lateral extent of the deck member.

11. The integrated duct step garnish assembly of claim 10 wherein the seal is affixed to an underside of the deck member and engages distal edges of wall members extending upward from the underside member to define the air duct.

12. The integrated duct step garnish assembly of claim 1 wherein each of the deck member and the underside member are injection molded to impart structural integrity to the air duct.

13. The integrated duct step garnish assembly of claim 1 wherein the underside member includes a lower wall and a plurality of side walls extending upwardly from the lower wall to define lateral sides and longitudinal ends of the air duct, an underside of the deck member engaging distal ends of the plurality of side walls to close the air duct.

14. The integrated duct step garnish assembly of claim 13 further including a seal interposed between the underside of the deck member and the distal ends to seal the air duct.

15. The integrated duct step garnish assembly of claim 1 wherein the underside member defines an outlet aperture therein for the air duct, the outlet aperture fully defined by the underside member at a rearward end of the underside member.

16. The integrated duct step garnish assembly of claim 15 wherein the underside member defines an inlet aperture therein for the air duct, the inlet aperture fully defined by an underside member adjacent a forward end of the underside member.

17. The integrated duct step garnish assembly of claim 16 wherein a direction of airflow entering the inlet aperture is perpendicularly oriented relative to a longitudinal extent of the air duct, and further wherein a reinforcing wall is angled obliquely relative to each of the direction of airflow entering the inlet aperture and the longitudinal extent of the air duct to smoothly guide the airflow around a ninety degree turn defined by the inlet aperture and the longitudinal extent of the air duct.

18. A combination step garnish and duct member for mounting to a sill member of a vehicle, comprising:
an injection molded deck member having an upper surface defining a stepping area; and
an injection molded underside member secured to an underside of the deck member to form a longitudinally extending air duct between the deck member and the underside member, the underside member including a plurality of integrally molded supporting structures for maintaining structural integrity of the air duct during application of stepping force to the stepping area, the plurality of integrally molded supporting structures having upward distal ends in abutting contact with the underside of the deck member.

19. The combination step garnish and duct member of claim 18 further including:
a seal member interposed between the deck member and the underside member to seal therebetween.

20. A method for installing an integrated duct step garnish assembly in a vehicle, comprising:
securing an underside member to an underside of a deck member to define an air duct between the underside member and the deck member, the deck member having a stepping area defined on an upper side thereof, the underside member nonintegrally formed relative to the deck member;
securing the underside member to a sill member in the vehicle; and
connecting inlet and outlet apertures of the air duct that are defined in the underside member to associated duct members disposed at longitudinal ends of the underside member.

* * * * *